March 26, 1968 W. S. ROBINSON 3,374,697
METHOD AND APPARATUS FOR SEVERING A TUBULAR MEMBER
Filed Oct. 21, 1965 3 Sheets-Sheet 1
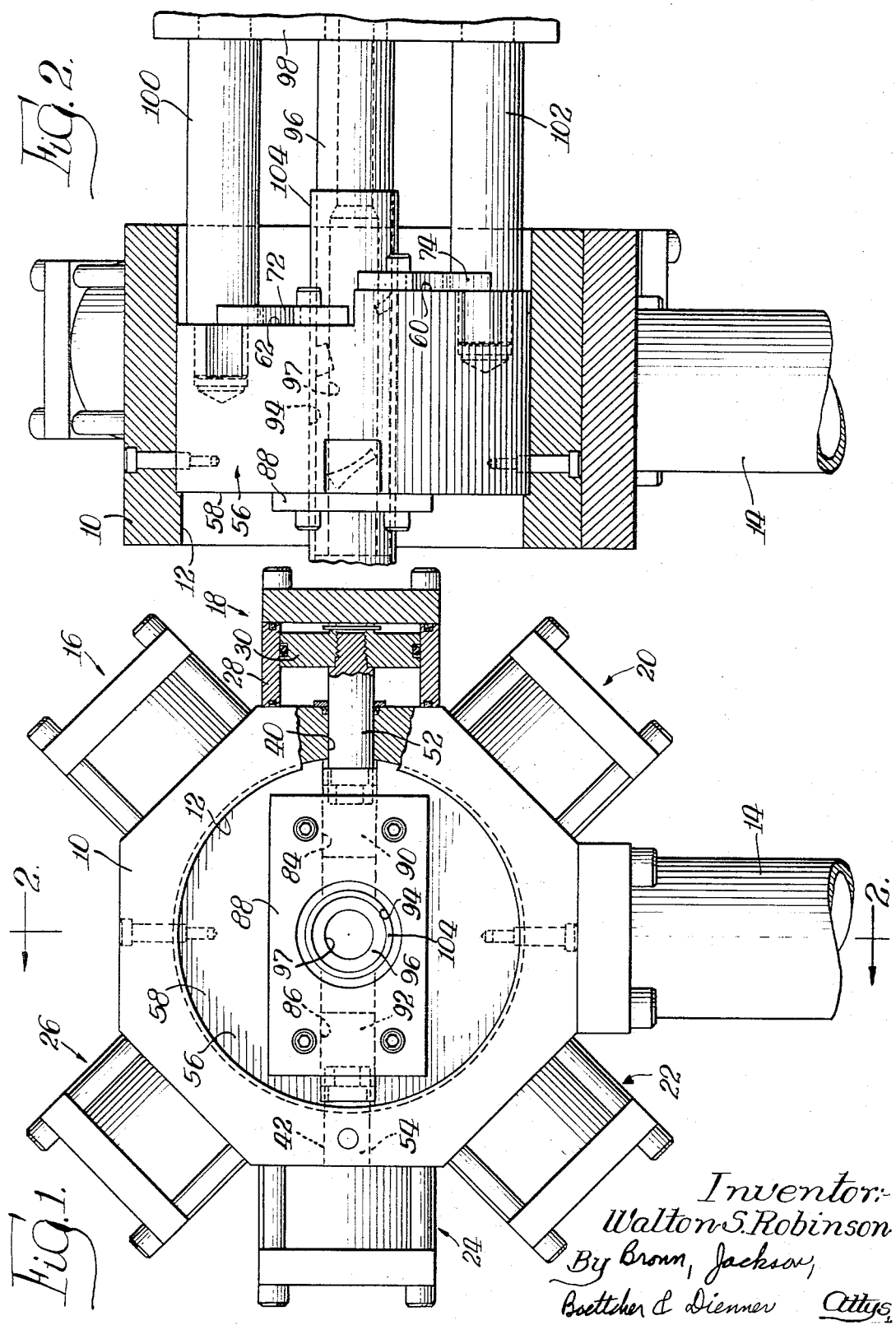
Inventor:
Walton S. Robinson
By Brown, Jackson,
Boettcher & Dienner Attys.

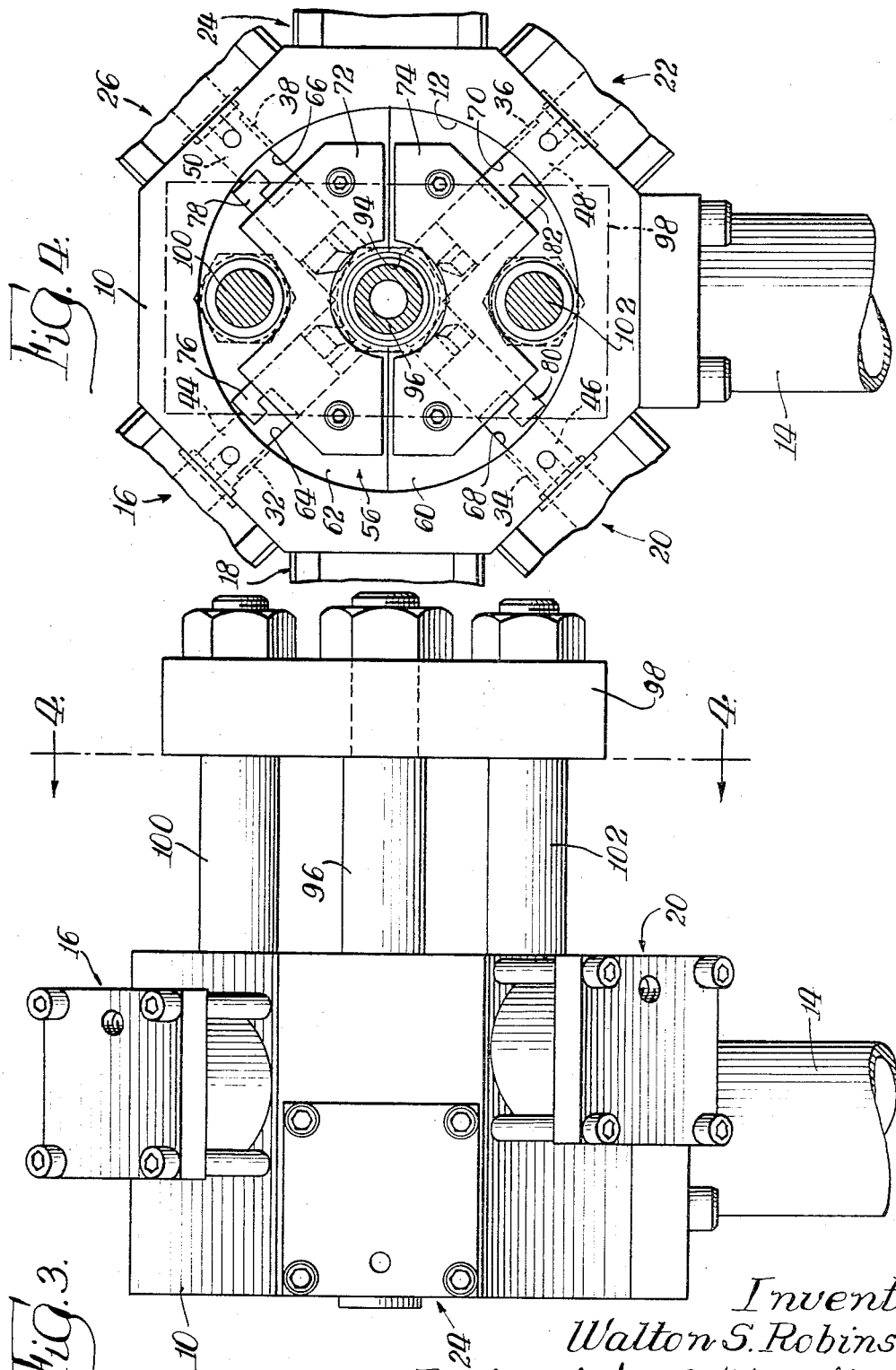

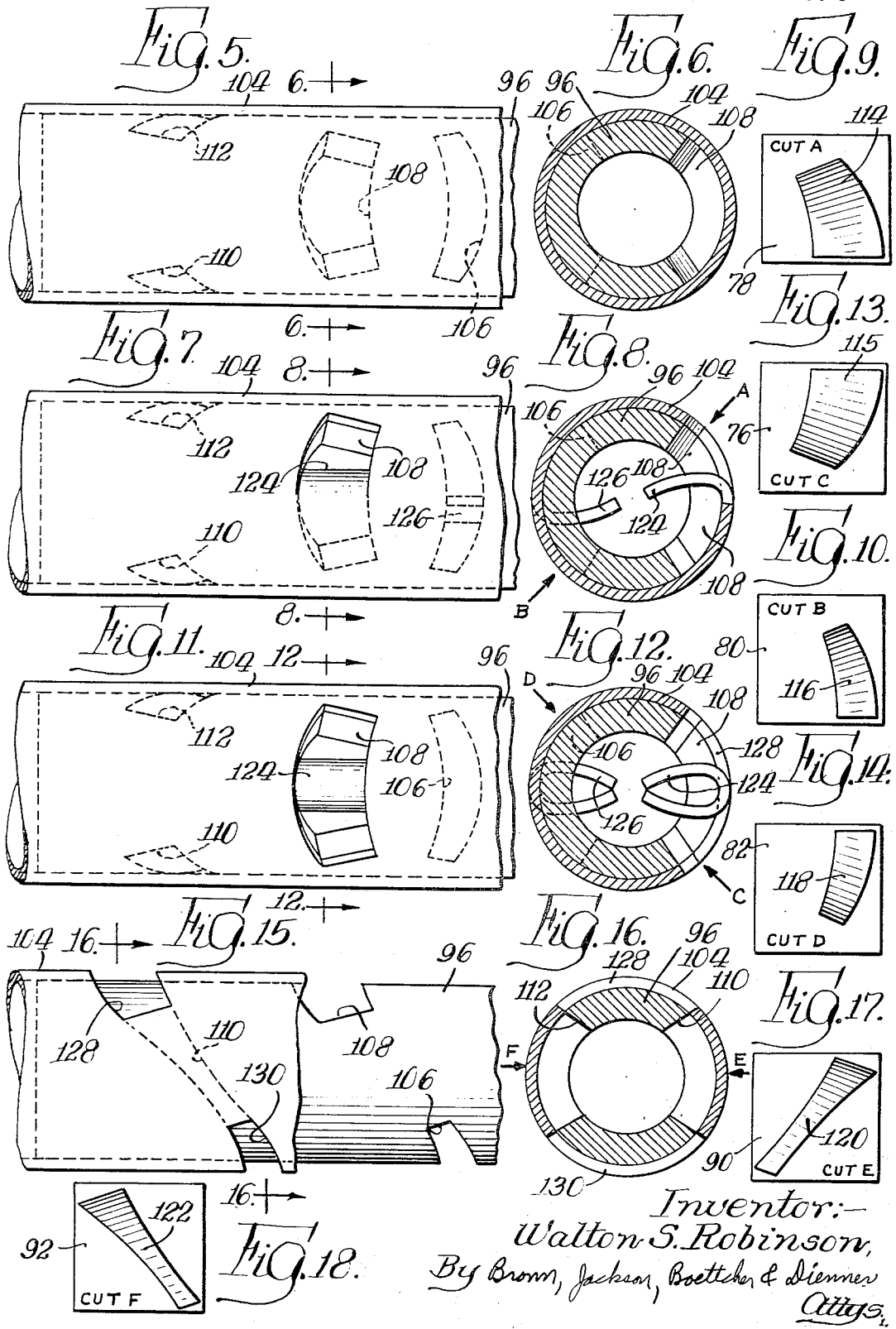

United States Patent Office 3,374,697
Patented Mar. 26, 1968

3,374,697
METHOD AND APPARATUS FOR SEVERING
A TUBULAR MEMBER
Walton S. Robinson, Tewksbury Township, Hunterdon County, N.J., assignor to Taylor Forge Inc., a corporation of Illinois
Filed Oct. 21, 1965, Ser. No. 499,172
14 Claims. (Cl. 83—35)

ABSTRACT OF THE DISCLOSURE

A method and apparatus for severing a tube blank from a tubular member by sequentially shearing out arcuate segments of the tubular member wherein the end portion of the tubular member is severed therefrom as a tube blank.

My present invention relates generally to a method and apparatus for severing a tube blank from a tubular member, and more specifically to a method and apparatus especially adapted for forming a tube blank with dissimilar contoured ends.

At the present time, it is common to shape a pipe elbow from a cylindrical tube or pipe blank. In accordance with one known procedure, such tube blank has its opposed ends cut on two different miters with a flat, perpendicular to the longitudinal axis of the blank, across the end of the steeper miter. The preparation of this type of tube blank requires sawing or abrasive cutting of the ends of the blank at the two angles and separate cutting or shearing to obtain the flat. When an elbow is formed from such a tube blank the ends are not radial; therefore, additional shearing or machining or both are required. Still further, certain of the edges at the mitered ends of the tube blank must be rounded, usually by hand, to avoid splitting of the blank during shaping operation.

It is an object of my present invention to provide a novel method and apparatus for severing a tubular member.

It is another object of my present invention to provide a method and apparatus, as described, wherein the end portion of the tubular member is severed therefrom as a tube blank with opposed contoured ends.

It is a further object of my present invention to provide a method and apparatus, as described, wherein the tubular member is severed by sequentially shearing or punching out arcuate segments of the tubular member.

By employing my method and apparatus, the ends of a tube blank are formed faster than they would be by sawing or abrasive cutting, the sheared ends of the tube blank by virtue of their shape produce an elbow that is radial on the ends when formed which is not possible with the known procedures of miter cutting, and handwork is eliminated because the contoured ends are sheared at right angles to the axis of the pipe and therefore do not have any knife edges that must be rounded to avoid splitting.

Now in order to acquaint those skilled in the art with the manner of practicing my present invention, I shall describe in connection with the accompanying drawings a preferred embodiment of my invention.

In the drawings:

FIGURE 1 is a front elevational view, with portions being broken away and shown in section, of apparatus embodying the principles of my present invention;

FIGURE 2 is a vertical view, partly in section and partly in elevation, taken substantially along the line 2—2 in FIGURE 1, looking in the direction indicated by the arrows;

FIGURE 3 is a side elevational view of the apparatus of FIGURE 1;

FIGURE 4 is a fragmentary rear view, partly in section and partly in elevation, taken substantially along the line 4—4 in FIGURE 3, looking in the direction indicated by the arrows;

FIGURE 5 is a fragmentary plan view, on an enlarged scale, of the mandrel of my apparatus supporting a tubular member for shearing;

FIGURE 6 is a sectional view, taken substantially along the line 6—6 in FIGURE 5, looking in the direction indicated by the arrows;

FIGURE 7 is a fragmentary plan view corresponding generally to FIGURE 5, and shows the tubular member at the completion of the first shearing operation;

FIGURE 8 is a sectional view, taken substantially along the line 8—8 in FIGURE 7, looking in the direction indicated by the arrows;

FIGURES 9 and 10 are end views of the punch members used in the first shearing operation;

FIGURE 11 is a fragmentary plan view corresponding generally to FIGURE 7, and shows the tubular member at the completion of the second shearing operation;

FIGURE 12 is a sectional view, taken substantially along the line 12—12 in FIGURE 11, looking in the direction indicated by the arrows;

FIGURES 13 and 14 are end views of the punch members used in the second shearing operation;

FIGURE 15 is a fragmentary side view corresponding generally to FIGURE 11, and shows the tubular member in axially shifted position for the third and final shearing operation;

FIGURE 16 is a sectional view, taken substantially along the line 16—16 in FIGURE 15, looking in the direction indicated by the arrows; and FIGURES 17 and 18 are end views of the punch members used in the third shearing operation.

Referring now to FIGURES 1–4, I shall describe a preferred embodiment of apparatus incorporating the principles of my present invention. Reference numeral 10 identifies a main housing having an octagonal periphery and having an internal generally cylindrical opening 12 therethrough. The housing 10 is suitably secured to and supported on a stationary frame member 14. Mounted on the opposite sides of the housing 10 are hydraulic piston and cylinder assemblies 16, 18, 20, 22, 24 and 26. Since the hydraulic assemblies are of identical construction, only the assembly 18, which comprises a cylinder 28 and a piston 30, is shown in detail (FIGURE 1).

Formed in the walls of the housing 10 are radially directed openings 32, 34, 36 and 38 (FIGURE 4), and 40 and 42 (FIGURE 1). Slidably received, respectively, in the foregoing housing openings are piston rods 44, 46, 48 and 50 (FIGURE 4), and 52 and 54 (FIGURE 1). The outer ends of the piston rods are suitably connected to the pistons of the respective hydraulic assemblies for actuation thereby. The axes of the piston rods 46 and 48 lie in a common plane; the axes of the piston rods 44 and 50 lie in a common plane spaced axially from the plane of the piston rods 46 and 48; and the axes of the piston rods 52 and 54 lie in a common plane axially spaced from the planes of the piston rods 44 and 50 and 46 and 48.

Mounted within the central opening of the housing 10 is a generally cylindrical bearing block 56 having a forward face 58, a lower rearward face 60 and an upper rearward inwardly offset face 62. As shown in FIGURE 4, generally rectangular radial channels 64 and 66 are formed in the block face 62, and similar channels 68 and 70 are formed in the block face 60. The channels 64 and 66 are covered by a plate 72, and the channels 68 and 70 are covered by a plate 74. Slidably mounted in the channels 64, 66, 68 and 70, respectively, are punch members 76, 78, 80 and 82 which at their outer ends are respectively interconnected with the adjacent inner ends of the piston rods 44, 50, 46 and 48. As shown in FIGURE 1, the forward face 58 of the bearing block 56 is formed with horizontal generally rectangular channels 84 and 86 which are covered by a plate 88. Slidably mounted in the channels 84 and 86, respectively, are punch members 90 and 92 which are respectively interconnected at their outer ends with the inner ends of the piston rods 52 and 54.

The bearing block 56 is formed with a central axial opening 94 through which extends a tubular mandrel 96 secured at its rear end in a frame member 98 interconnected with and supported by the bearing block 56 through support rods 100 and 102. The mandrel 96 serves to slidably receive the end portion of a tubular member 104 for a purpose to be described in detail hereinafter. The tubular member 104 may be of any suitable material including, by way of example only, stainless steel or non-ferrous metals. The mandrel 96, as best shown in FIGURE 5, has a first pair of opposed axially spaced arcuate apertures 106 and 108 formed therein, and, as shown in FIGURES 15 and 16, has a second pair of opposed arcuate apertures 110 and 112 formed therein axially spaced from the first pair of apertures 106 and 108 and circumferentially displaced relative thereto. The arcuate aperture 106 is arranged immediately above the punch members 80 and 82, the arcuate aperture 108 lies immediately below the punch members 76 and 78, and the apertures 110 and 112 are arranged adjacent the inner ends of the punch members 90 and 92 respectively. The punch members 78 and 76 (FIGURES 9 and 13) are respectively provided with nose portions 114 and 115 that are individually receivable in the arcuate aperture 108; the punch members 80 and 82 (FIGURES 10 and 14) are respectively provided with nose portions 116 and 118 that are individually receivable in the arcuate aperture 106; and the punch members 90 and 92 (FIGURES 17 and 18) are respectively provided with nose portions 120 and 122 that are receivable in the arcuate apertures 110 and 112.

In using the foregoing apparatus in practicing the principles of my present invention, the tubular member 104, which may be of any initial length, is slid over the tubular mandrel 96. In the first shearing operation, the opposed hydraulic assemblies 26 and 20 are actuated for moving the punch members 78 and 80 radially inwardly. As the nose portions 114 and 116 of the punch members 78 and 80 are forced against the walls of the tubular member 104 in the direction of the arrows A and B (FIGURE 8), they punch, shear or cut out through the apertures 108 and 106 in a partial curl slightly more than one-half of two arcuate segments or slugs 124 and 126. The punch members 78 and 80 are then withdrawn radially outwardly, and, as part of the second operation, the hydraulic assemblies 16 and 22 are actuated for moving the punch members 76 and 82 radially inwardly. As the nose portions 115 and 118 of the punch members 76 and 82 are forced against the walls of the tubular member 104 in the direction of the arrows C and D (FIGURE 12), they punch, shear or cut out through the apertures 108 and 106 in a closing curl the remaining halves of the two arcuate segments or slugs 124 and 126. After the segments 124 and 126 have been severed and punshed into the bore of the mandrel, the punches 76 and 82 are withdrawn radially outwardly. The tubular member 104, which is left with two open arcuate bands or zones 128 and 130, is next shifted axially forwardly to locate the arcuate segments which lie intermediate of the zones 128 and 130 over the mandrel apertures 110 and 112. Then, in the final shearing operation, the hydraulic assemblies 18 and 24 are actuated for moving the punch members 90 and 92 radially inwardly. As the nose portions 120 and 122 of the punch members 90 and 92 are forced against the walls of the tubular member 104 in the direction of the arrows E and F (FIGURE 16), they punch, shear or cut out through the apertures 110 and 112, in a straight through action, full arcuate segments or slugs from the tubular member between the ends of the two arcuate zones 128 and 130. After the latter sheared segments fall into the bore of the mandrel, the punches 90 and 92 are withdrawn radially outwardly. As a result of the foregoing operations, the end portion of the tubular member 104 is severed therefrom leaving a contoured end on the main portion of the tubular member.

The tubular member 104 is next slid off of the tubular mandrel 96, and the severed end portion and sheared out slugs are ejected from the mandrel. The tubular member 104 is then again slid over the mandrel 96 and the punch members are actuated as described above for sequentially shearing out arcuate segments of the tubular member at a location spaced axially from the first contoured end whereby the end portion of the tubular member is severed therefrom as a tube blank with opposed contoured ends. The resultant tube blank with opposed contoured ends may thereafter be shaped, for example, into a pipe elbow. While I have described the forming of one tube blank only, it will be appreciated that I contemplate the forming of successive tube blanks from a single tubular member. In these circumstances, the ends of the tubular member at the opposite sides of each group of sheared out segments respectively define the trailing end of one tube blank and the leading end of the succeeding tube blank. When the tube blanks are to be shaped into pipe elbows, it is desirable that the opposed contoured leading and trailing ends thereof be dissimilar. To obtain this result, the opposite sides of each nose portion of the punch members are preferably of dissimilar contour as shown whereby to effect a dissimilar contour of the adjacent ends of the tubular member at each location of severance. In addition, when the tube blanks are to be shaped into pipe elbows, the tubular member is indexed 180 degrees about its longitudinal axis between severance cycles. Preferably, feeding of the tubular member to the described apparatus is effected automatically by any appropriate means. Although I have disclosed that the punch members are hydraulically actuated, alternatively they may be pneumatically or mechanically actuated. Also, while six punches are used in the apparatus and method disclosed, this number may be varied to accommodate differing operating conditions. I have found that the method and apparatus of my present invention may be used for shearing tubular members having a diameter to wall thickness ratio ranging between 100 to 1 and 10 to 1.

While I have shown and described a preferred embodiment of my present invention, it will be understood by those skilled in the art that various rearrangements and modifications may be made therein without departing from the spirit and scope of my invention.

I claim:

1. A method of severing a tubular member, comprising sequentially shearing out arcuate segments around the full circumference of the tubular member in a plane oblique to the longitudinal axis of the tubular member, which arcuate segments have non-planar sides, whereby to obtain a contoured end.

2. A method of severing a tube blank from a tubular member, comprising sequentially shearing out arcuate segments of the tubular member in a plane spaced from the end of and oblique to the longitudinal axis of the tubular member, which arcuate segments have non-planar sides, whereby the end portion of the tubular member is severed therefrom as a tube blank with a contoured end.

3. A method of severing a tube blank from a tubular member, comprising shearing out two arcuate segments from opposite sides of the tubular member leaving open arcuate zones, and shearing out arcuate segments from the tubular member between said open arcuate zones, with the arcuate segments having non-planar sides and lying in a plane other than one to which the axis of the tubular member is normal, whereby the end portion of the tubular member is severed therefrom as a tube blank.

4. A method of severing a tube blank from a tubular member, comprising first shearing out approximately one-half of each of two arcuate segments from opposite sides of the tubular member, then shearing out the remaining halves of said two arcuate segments leaving open arcuate zones, and finally shearing out arcuate segments from the tubular member between said open arcuate zones, with the arcuate segments lying in a plane other than one to which the axis of the tubular member is normal, whereby the end portion of the tubular member is severed therefrom as a tube blank.

5. A method of severing a tube blank from a tubular member, comprising first shearing out approximately one-half of each of two axially spaced arcuate segments from opposite sides of the tubular member at a location spaced from the end of the latter, then shearing out the remaining halves of said two arcuate segments leaving open arcuate zones, and finally shearing out arcuate segments from opposite sides of the tubular member between said open arcuate zones whereby the end portion of the tubular member is severed therefrom as a tube blank with a contoured end.

6. A method of forming a tube blank from a tubular member, comprising sequentially shearing out one group of arcuate segments of the tubular member which segments have non-planar sides and lie in a plane oblique to the longitudinal axis of the tubular member whereby to obtain a contoured end, and sequentially shearing out another group of arcuate segments of the tubular member which segments have non-planar sides and lie in a plane oblique to the longitudinal axis of the tubular member at a location spaced axially from said contoured end whereby the end portion of the tubular member is severed therefrom as a tube blank with opposed contoured ends.

7. The method of claim 6 wherein the opposed sides of each group of arcuate segments present different contours such that the adjacent sheared ends of the tubular member are of different contour so that the severed tube blank has dissimilar opposed contoured ends.

8. A method of severing a tube blank from a tubular member, comprising moving the tubular member onto a tubular mandrel having a first pair of opposed axially spaced arcuate apertures formed therein and having a second pair of opposed arcuate apertures formed therein axially spaced from said first pair of apertures and circumferentially displaced relative to said first pair of apertures, shearing out approximately one-half of two arcuate segments from opposite sides of the tubular member through said first pair of apertures, shearing out the remaining halves of the two arcuate segments through said first pair of apertures leaving open arcuate zones, moving the tubular member axially to disposed the arcuate segments of the tubular member between said open arcuate zones over the second pair of arcuate apertures, and shearing out arcuate segments from the tubular member through said second pair of apertures whereby the end portion of the tubular member is severed therefrom as a tube blank with a contoured end.

9. Apparatus for severing a tube blank from a tubular member, comprising first punch means having non-planar sides for shearing out two arcuate segments from the tubular member leaving open arcuate zones, and second punch means having non-planar sides for shearing out arcuate segments from the tubular member between said open arcuate zones whereby the end portion of the tubular member is severed therefrom as a tube blank.

10. Apparatus for severing a tube blank from a tubular member, comprising first axially spaced opposed punch means for shearing out two arcuate segments from opposite sides of the tubular member leaving open arcuate zones, and second opposed punch means axially spaced from said first punch means for shearing out arcuate segments from the tubular member between said open arcuate zones whereby the end portion of the tubular member is severed therefrom as a tube blank with a contoured end.

11. Apparatus for severing a tube blank from a tubular member, comprising a first pair of punch members movable to shear out approximately one-half of two arcuate segments from the tubular member, a second pair of punch members movable to shear out the remaining halves of the two arcuate segments leaving open arcuate zones, and a third pair of punch members movable to shear out arcuate segments from the tubular member between said open arcuate zones whereby the end portion of the tubular member is severed therefrom as a tube blank.

12. Apparatus for severing a tube blank from a tubular member, comprising a tubular mandrel for slidably receiving the tubular member, said mandrel having a first pair of arcuate apertures formed therein and having a second pair of arcuate apertures formed therein, a first pair of punch members movable to shear out approximately one-half of two arcuate segments from the tubular member through said first pair of apertures, a second pair of punch members movable to shear out the remaining halves of the two arcuate segments through said first pair of apertures leaving open arcuate zones, and a third pair of punch members movable to shear out arcuate segments from the tubular member between said open arcuate zones through said second pair of apertures whereby the end portion of the tubular member is severed therefrom as a tube blank.

13. Apparatus for severing a tube blank from a tubular member, comprising a tubular mandrel for slidably receiving the tubular member, said mandrel having a first pair of opposed axially spaced arcuate apertures formed therein and having a second pair of opposed arcuate apertures formed therein axially spaced from said first pair of apertures and circumferentially displaced relative to said first pair of apertures, a first pair of axially spaced opposed punch members movable radially to shear out approximately one-half of two arcuate segments from opposite sides of the tubular member through said first pair of apertures, a second pair of axially spaced opposed punch members movable radially to shear out the remaining halves of the two arcuate segments through said first pair of apertures leaving open arcuate zones, and a third pair of opposed punch members movable radially to shear out arcuate segments from the tubular member between said open arcuate zones through said second pair of apertures whereby the end portion of the tubular member is severed therefrom as a tube blank with a contoured end.

14. In apparatus for severing a tube blank from a tubular member, a tubular mandrel having a first pair of opposed axially spaced arcuate apertures formed therein and having a second pair of opposed arcuate apertures formed therein axially spaced from said first pair of apertures and circumferentially displaced relative to said first pair of apertures.

References Cited

UNITED STATES PATENTS

| | | | |
|---|---|---|---|
| 2,064,539 | 12/1936 | Hart | 83—54 X |
| 2,765,848 | 10/1956 | Bakula | 83—693 X |
| 2,875,829 | 3/1959 | Patrick | 83—193 |
| 3,120,143 | 2/1964 | Kreider | 83—917 X |
| 3,273,433 | 9/1966 | Borzym | 83—54 |

ANDREW R. JUHASZ, *Primary Examiner.*